US006771948B2

(12) United States Patent
Salzwedel

(10) Patent No.: US 6,771,948 B2
(45) Date of Patent: Aug. 3, 2004

(54) BACKGROUND DATA QUERIES IN WIRELESS WEB APPLICATIONS

(75) Inventor: Mark D. Salzwedel, Vista, CA (US)

(73) Assignee: Denso Corporation, Kariya (JP)

( * ) Notice: Subject to any disclaimer, the term of this patent is extended or adjusted under 35 U.S.C. 154(b) by 594 days.

(21) Appl. No.: 09/757,779

(22) Filed: Jan. 9, 2001

(65) Prior Publication Data

US 2002/0090928 A1 Jul. 11, 2002

(51) Int. Cl.[7] .............................................. H04M 11/00
(52) U.S. Cl. ...................... 455/408; 455/406; 455/458; 455/574; 455/418; 455/407; 455/409; 379/28; 379/126; 379/114.2; 379/114.01; 379/91.01; 370/348
(58) Field of Search ................................. 455/408, 406, 455/458, 574, 418, 407, 409; 379/28, 126, 114.2, 114.01, 91.01; 370/348

(56) References Cited

U.S. PATENT DOCUMENTS 5,970,121 A * 10/1999 Homayoun ................... 379/28
6,175,741 B1 * 1/2001 Alperovich ................. 455/458
6,480,710 B1 * 11/2002 Laybourn et al. ........... 455/406

* cited by examiner

Primary Examiner—Erika Gary
Assistant Examiner—David Nguyen
(74) Attorney, Agent, or Firm—Harness, Dickey & Pierce, PLC

(57) ABSTRACT

The mobile station includes a system for using open channel time not needed during access to the wireless web. The mobile station monitors the use of the channel, and determines when the user is no longer transmitting or receiving information. Until the current network session terminates, the mobile station may operate in the background to either send or receive information with the network. Any action taken by the user would take priority over the background operations.

13 Claims, 3 Drawing Sheets

BACKGROUND DATA QUERIES IN WIRELESS WEB APPLICATIONS

TECHNICAL FIELD

This invention relates to wireless Internet access, and more particularly to enhancing connection time during wireless Internet use.

BACKGROUND

The Internet is a rapidly growing communication network of interconnected computers and computer networks around the world. Together, these millions of connected computers form a vast repository of hyperlinked information that is readily accessible by any of the connected computers from anywhere at any time. To provide mobility and portability of the Internet, wireless Internet computing devices were introduced and are capable of communicating, via wireless data networks, with the computers on the Internet. With the wireless data networks, people, as they travel or move about, are able to perform, through the wireless computing devices, exactly the same tasks they could do with computers on the Internet.

Regular mobile phones can return calls, check voice mail or enable users to be available for teleconferences anywhere at any time. However, new two-way interactive communication devices, such as mobile devices or mobile phones, would meld voice, data, and personal digital assistants (PDA) functionality into a single portable equipment that is not just reactive to calls but also proactive, through a proxy computer, accessing a myriad of public and enterprise information services in the Internet. For example, a traveler may request the departure time of a next available flight when on the way to an airport, or a trader may purchase shares of stock at a certain price. The pertinent information from these requests or transactions may include the airline and the flight number for the traveler, as well as the stock name, the number of shares and the price being purchased for the trader. To be timely and periodically informed, one way is to electronically communicate the information requests into a mobile device that is connected to a wireless data network. The wireless data network, for example, connects, through a proxy server, to a flight information server or stock quote server from which the desired flight information or the current stock price can be retrieved by the mobile device on demand.

In a circuit-switched network, such as CDMA, a mobile device must establish a circuit in a carrier infrastructure via a wideband channel before communicating with any server on the network. Although the connection may only be needed for a few seconds, many cellular service providers keep the channel open, and bill, in minute increments. Thus, there are often large blocks of time when the channel is available, but no data is being transmitted over the channel. What is needed is a system that enhances the amount of data sent over any open channels.

SUMMARY

The mobile station includes a system for using open channel time not needed during access to the wireless web. The mobile station monitors the use of the channel, and determines when the user is no longer transmitting or receiving information. Until the current network session terminates, the mobile station may operate in the background to either send or receive information with the network. Any is action taken by the user would take priority over the background operations.

DESCRIPTION OF DRAWINGS

These and other features and advantages of the invention will become more apparent upon reading the following detailed description and upon reference to the accompanying drawings.

DETAILED DESCRIPTION

Figure 1:
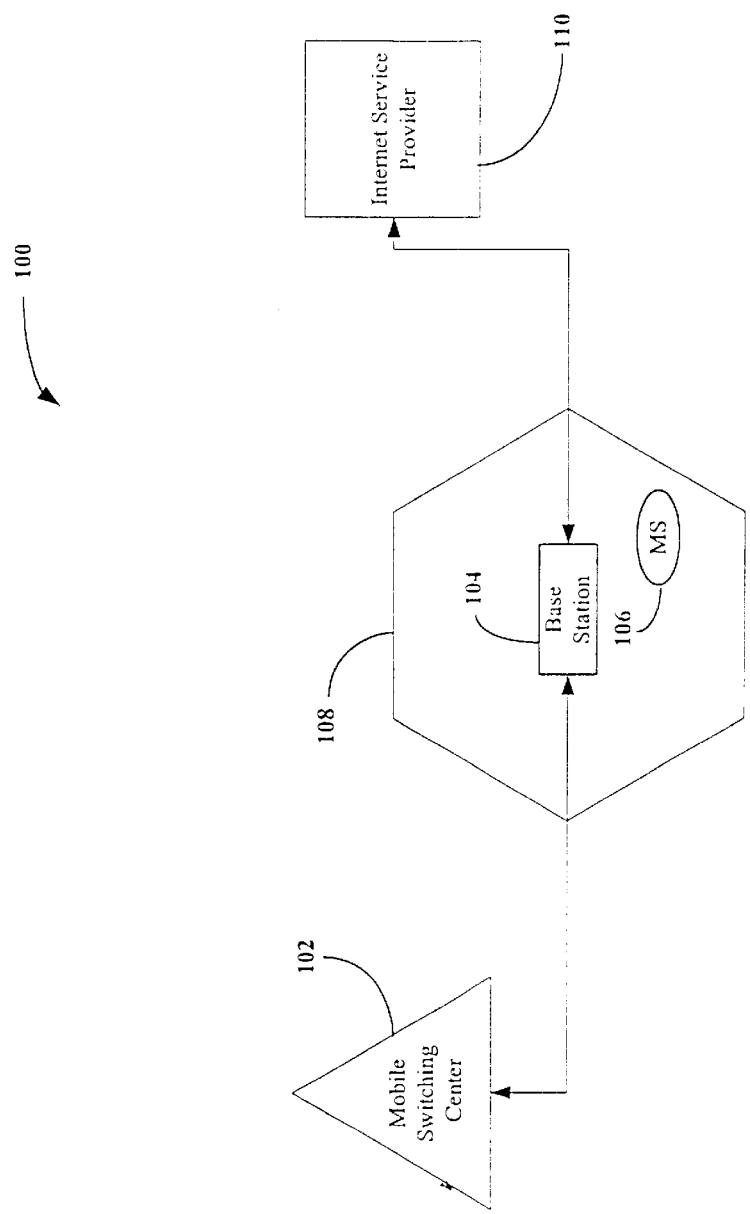
FIG. 1 illustrates components of a wireless communication system appropriate for use with an embodiment of the invention.

FIG. 1 illustrates components of a wireless communication system 100. A mobile switching center 102 communicates with a base station 104. The base station 104 broadcasts data to and receives data from mobile stations 106 within a cell 108. The cell 108 is a geographic region, roughly hexagonal, having a radius of up to 35 kilometers or possibly more. The base station 104 may also communicate with an Internet Service Provider (ISP) 110. The ISP 110 provides an interface between the wireless communication system 100 and the world wide web, or Internet. In some embodiments, the mobile station 106 communicates with the ISP 110 through the base station 104. However, it can be appreciated that the mobile station 106 may directly communicate with the ISP 110.

The mobile station 106 is capable of receiving data from and transmitting data to a base station 104. Additional cells adjacent to the cell 108 permit mobile stations 106 to cross cell boundaries without interrupting communications. This is because base stations 104 in adjacent cells assume the task of transmitting and receiving data for the mobile stations 106. The mobile switching center 102 coordinates all communication to and from mobile stations 106 in a multi-cell region, thus the mobile switching center 102 may communicate with many base stations 104.

The mobile stations 106 may move about freely within the cell 108 while communicating either voice or data. The mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone synchronizes communication with the base station 104. The cellular telephone then registers with the mobile switching center 102 to make itself known as an active user within the wireless network.

The mobile station 106 scans data frames broadcast by the base station 104 to detect any telephone calls or paging messages directed to the cellular telephone. In this call detection mode, the mobile station 106 receives, stores and examines paging message data, and determines whether the data contains an identifier matching an identifier of the mobile station 106. If a match is detected, the mobile station 106 establishes a call with the mobile switching center 102 via the base station 104. If no match is detected, the mobile station 106 enters an idle state for a predetermined period of time, then exits the idle state to receive another transmission of paging message data.

Figure 2:
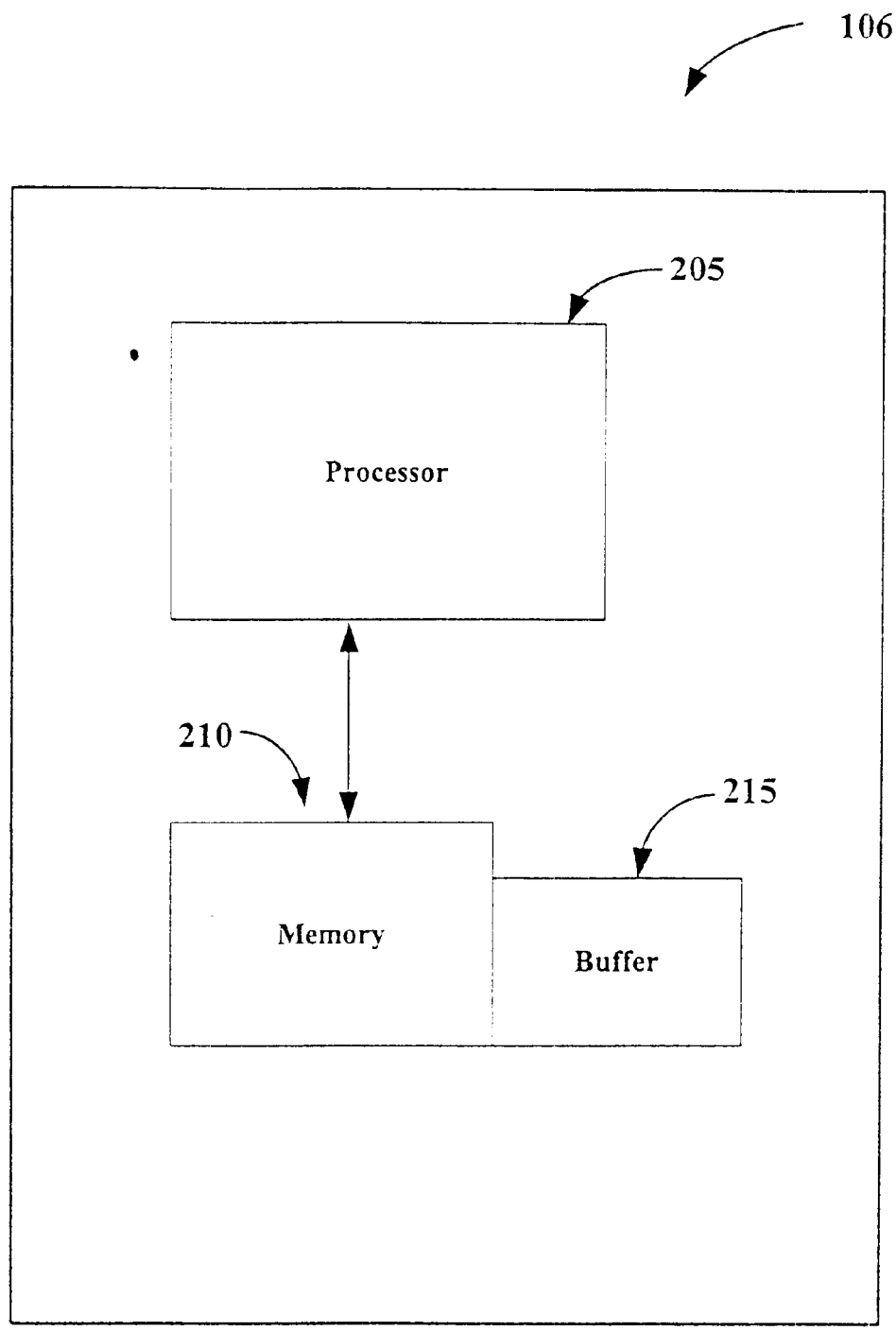
FIG. 2 is a block diagram showing features of a mobile station according to one embodiment of the invention.

FIG. 2 shows a block diagram of the mobile station 106 and the processing that occurs in that mobile station 106. A processor 205 is driven by programs stored in a memory 210. Any information received by the mobile station 106 may be stored in the memory 210 or a buffer 215. The buffer 215 may store information obtained from the Internet service provider 110.

Figure 3:
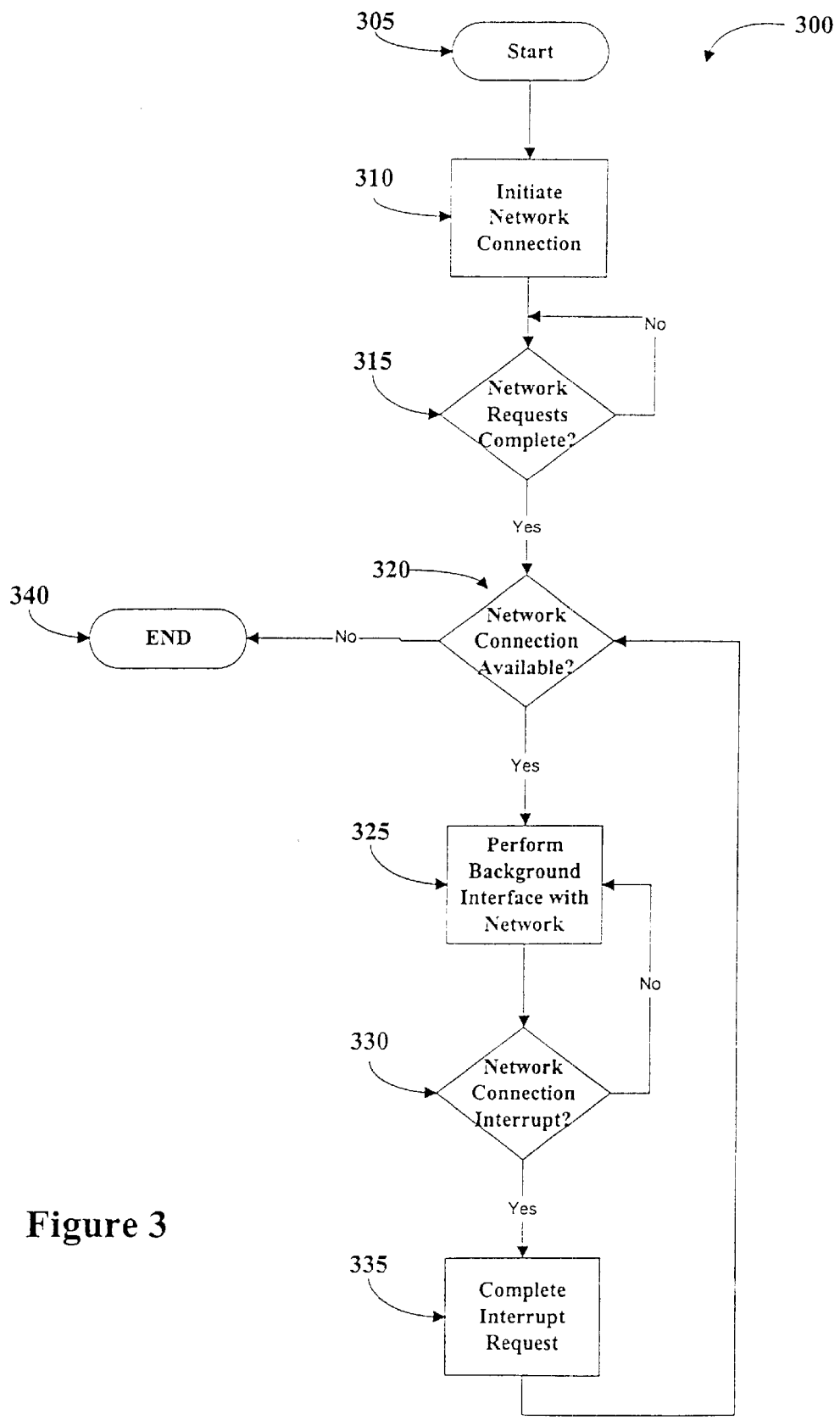
FIG. 3 illustrates the process of utilizing the network resources by a mobile station according to one embodiment of the present invention.

FIG. 3 illustrates the process 300 according to one embodiment of utilizing the network resources by a mobile station 106. The process 300 begins at a START block 305. Proceeding to block 310, the mobile station 106 initiates a network connection with the ISP 110. The network connection may be opened as the result of a user requesting information from the network, such as the latest stock prices or sports scores. As stated above, the mobile station 106 communicates within the wireless communication system 100 with the ISP 110. Many ISPs provide connections in set time intervals, such as one minute. If the requested information from the user is successfully transferred in less than a whole time interval, the network connection may remain open for the remainder of the time interval. For example, if an ISP provides connections in one minute intervals, a user request that takes one minute, five seconds to complete will leave fifty-five seconds of a time interval unused. Typically, the network connection may remain open for the remaining fifty-five seconds awaiting further user requests. However, the user may choose to manually terminate the connection. If the connection is not manually terminated, the mobile station 106 may use a timer, such as a linger timer, to determine when to terminate the connection. The linger timer may count down the remaining amount of unused time in a time interval, and if no further requests are made during that period, the mobile station 106 may automatically terminate the connection at the expiration of the linger timer. Because the ISP bills in whole time intervals, no additional charges are incurred by waiting for the expiration of the linger timer, whether or not data is transmitted along the network connection.

Proceeding to block 315, the process 300 determines whether all of the user network requests have been completed. If the requests are still being processed, the mobile station 106 proceeds along the NO branch in a loop back to block 315. Thus, the mobile station 106 may continually monitor the status of the user requests to be able to determine when all the requests have been satisfied.

Once the requests have been completed, the process 300 proceeds along the YES branch to block 320. In block 320, the mobile station 106 determines whether the network connection is still available. If the user requests took up the substantial portion of the time interval, there may not be a sufficient amount of useful time remaining. Further, after completing all the requests, the user may have manually terminated the network connection. If no network connection is available, the process 300 proceeds along the NO branch to terminate in END block 340.

Returning to block 320, if the network connection remains available, the process 300 proceeds along the YES branch to block 325. In block 325, the mobile station 106 interfaces with the network in the background. The mobile station 106 may take advantage of this connection time to download information that may be accessed later by the user or used by the mobile station 106. For example, the mobile station 106 may retrieve updated billing information from the network. This information may be saved within the memory 210 of the mobile station 106, along with the time the information was obtained. Thus, if the user later checks the memory 210 of the mobile station 106, the latest billing data would be available. The ISP 110 may also use this time to update the mobile station 106 about network information, such as the appropriate address needed to retrieve e-mail or other information. The mobile station 106 may also transmit information during this time period. For example, the mobile station 106 may transmit data to the network regarding the user profile, and whether particular directed advertisements were viewed or deleted. Of course, the user may have the option to disable any of these features through a menu in the mobile station 106.

Proceeding to block 330, the mobile station 106 continually checks for a network connection interrupt while performing the background interfacing. Typically, the background interfacing has the lowest priority, and is stopped if any other activity is requested. Further, the processing of information during the time interval does not reset the linger timer. The interrupt activities may include an additional user request, expiration of the linger timer requiring termination of the network connection, or a network request. In no network interrupt is detected, the process 300 proceeds along the NO branch back to block 325 to continue with the background interface. If a network interrupt is detected, the process 300 proceeds along the YES branch to block 335.

In block 335, the mobile station 106 handles the activity required by the interrupt request. If the interrupt request was initiated by expiration of the linger timer, the activity required would be to terminate the network connection. If the interrupt request was initiated by an additional user request, the mobile station 106 would transmit the request along the network connection. Of course, an additional user request along the network connection may reset the linger timer. After the activity requested by the interrupt is completed, the process 300 returns to block 320 to determine if the network connection 320 remains available. If the linger timer has expired and the network connection terminated, the process 300 will proceed along the NO branch and terminate in END block 340. If the network connection remains available, the process 300 may proceed along the YES branch for further background processing in block 325.

Numerous variations and modifications of the invention will become readily apparent to those skilled in the art. Accordingly, the invention may be embodied in other specific forms without departing from its spirit or essential characteristics.

What is claimed is:

1. A method of utilizing a network connection in a wireless communication system comprising:

establishing the network connection for one or more billing intervals;

receiving initial information corresponding to requested network activities:

determining that all the requested network activities are completed;

detecting an amount of time that the network connection will remain active in the current billing interval; and automatically communicating along the network connection for receiving updated information not corresponding to the requested network activities when the amount of time that the network will remain active is greater than a specified amount.

2. The method of claim 1, further comprising initiating the network connection in response to one or more requested network activities.

3. The method of claim 1, further comprising retrieving data along the network connection during the automatic communication.

4. The method of claim 3, further comprising retrieving updated billing information along the network connection during the automatic communication.

5. The method of claim 1, further comprising transmitting data from the mobile station along the network connection during the automatic communication.

6. The method of claim 1, further comprising monitoring for network interrupts.

7. The method of claim 1, further comprising disconnecting the network connection upon expiration of a timer.

8. The method of claim 5, further comprising entering no additional billing time interval while communicating along the network connection.

9. A mobile station comprising:

a network interface which communicates with an external network;

an interval timer which calculates the amount of time remaining in a billing interval;

a processor which completes one or more requests along the network interface and receives information corresponding to the one or more requests; wherein:

the processor receives the initial information corresponding to the one or more requests and initiates automatic communication along the network interface after receiving the initial information to receive updated information not corresponding to the one or more requests, the updated information being in the same category as the initial information; the mobile station further comprising:

memory which stores the updated information transmitted along the network interface prior to expiration of the interval timer.

10. The mobile station of claim 9, wherein the automatic communication transmits updated billing information to the mobile station.

11. The mobile station of claim 9, wherein the automatic communication transmits historical data from the mobile station.

12. The mobile station of claim 9, wherein the automatic communication is terminated in response to a network interrupt.

13. The mobile station of claim 12, wherein the network interrupt includes initiation of a user request.

\* \* \* \* \*